United States Patent
Kim

(10) Patent No.: US 9,447,290 B2
(45) Date of Patent: Sep. 20, 2016

(54) POWDER PAINT COMPOSITION AND METHOD FOR PREPARING SAME

(71) Applicant: Hyundai Motor Company, Seoul (KR)

(72) Inventor: Hwan Oh Kim, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 288 days.

(21) Appl. No.: 14/132,288

(22) Filed: Dec. 18, 2013

(65) Prior Publication Data

US 2015/0064444 A1    Mar. 5, 2015

(30) Foreign Application Priority Data

Sep. 5, 2013 (KR) .................. 10-2013-0106807

(51) Int. Cl.

| | | |
|---|---|---|
| *B29B 9/08* | (2006.01) | |
| *B29B 9/12* | (2006.01) | |
| *B29B 9/16* | (2006.01) | |
| *C09D 5/03* | (2006.01) | |
| *C09D 133/04* | (2006.01) | |
| *C09D 133/14* | (2006.01) | |
| *C09D 163/00* | (2006.01) | |
| *C09D 167/00* | (2006.01) | |
| *B05D 7/00* | (2006.01) | |
| *C08K 3/04* | (2006.01) | |
| *C08K 3/08* | (2006.01) | |
| *C08K 3/26* | (2006.01) | |
| *C08K 3/30* | (2006.01) | |

(Continued)

(52) U.S. Cl.

CPC .............. *C09D 5/035* (2013.01); *C09D 167/00* (2013.01); *B05D 5/068* (2013.01); *B05D 7/00* (2013.01); *B05D 7/53* (2013.01); *B05D 7/536* (2013.01); *B05D 2401/32* (2013.01); *B05D 2451/00* (2013.01); *B05D 2601/08* (2013.01); *B29B 9/08* (2013.01); *B29B 9/12* (2013.01); *B29B 9/16* (2013.01); *B29B 2009/163* (2013.01); *C08K 3/04* (2013.01); *C08K 3/08* (2013.01); *C08K 2003/0812* (2013.01); *C08K 2003/265* (2013.01); *C08K 2003/3045* (2013.01); *C09D 5/03* (2013.01); *C09D 5/033* (2013.01); *C09D 133/04* (2013.01); *C09D 133/068* (2013.01); *C09D 133/14* (2013.01); *C09D 163/00* (2013.01); *Y10T 428/254* (2015.01)

(58) Field of Classification Search
None
See application file for complete search history.

(56) References Cited

U.S. PATENT DOCUMENTS

| | | | |
|---|---|---|---|
| 3,758,632 A | * | 9/1973 | Labana ............... C09D 133/062 428/417 |
| 3,758,633 A | * | 9/1973 | Labana ............... C09D 133/064 260/DIG. 16 |

(Continued)

FOREIGN PATENT DOCUMENTS

| | | | |
|---|---|---|---|
| JP | 2001139887 A | | 5/2001 |
| JP | 2001-181576 | * | 7/2001 |

(Continued)

*Primary Examiner* — Vivian Chen
(74) *Attorney, Agent, or Firm* — Mintz Levin Cohn Ferris Glovsky and Popeo, P.C.; Peter F. Corless

(57) ABSTRACT

Disclosed is a powder paint composition of and a method for preparing the same. More particularly, the present invention relates to a powder paint composition including a powder paint prepared by physically attaching metallic particles to a powder resin, which exhibits no separation or aggregation of metallic particles when coated and significantly improves metallic texture owing to orientation of the metallic particles, and a method for preparing the same.

10 Claims, 3 Drawing Sheets

(51) Int. Cl.
*B05D 5/06* (2006.01)
*C09D 133/06* (2006.01)

(56) References Cited

U.S. PATENT DOCUMENTS

| | | | | |
|---|---|---|---|---|
| 3,758,634 A * | 9/1973 | Labana | | C08G 59/3209 260/DIG. 16 |
| 3,758,635 A * | 9/1973 | Labana | | C08G 59/3209 260/DIG. 16 |
| 3,781,380 A * | 12/1973 | Labana | | C08G 59/3209 524/904 |
| 4,145,370 A * | 3/1979 | Sreeves | | C09D 163/00 523/459 |
| 4,147,737 A * | 4/1979 | Sein | | C08G 63/20 427/185 |
| 4,197,351 A * | 4/1980 | Rolles | | B05D 5/067 264/162 |
| 4,307,153 A * | 12/1981 | Bernelin | | C08G 63/20 427/195 |
| 5,043,401 A * | 8/1991 | Matsuzaki | | C08G 59/226 523/427 |
| 5,187,220 A * | 2/1993 | Richart | | C08J 3/203 428/407 |
| 5,212,245 A * | 5/1993 | Franks | | C09D 5/037 428/334 |
| 5,264,254 A | 11/1993 | Bohnacker et al. | | |
| 5,470,893 A * | 11/1995 | Sinclair-Day | | C09D 5/032 523/200 |
| H1667 H | 7/1997 | Poincloux | | C09D 163/00 525/438 |
| 5,856,378 A * | 1/1999 | Ring | | C08J 3/203 428/407 |
| 6,117,952 A * | 9/2000 | Finter | | C08G 59/38 525/427 |
| 6,162,856 A * | 12/2000 | Crompton | | C08J 3/203 524/439 |
| 6,166,123 A * | 12/2000 | Blatter | | C08J 3/203 524/439 |
| 6,299,937 B1 * | 10/2001 | Richart | | B05D 7/02 427/212 |
| 6,541,540 B2 * | 4/2003 | Hashizume | | C09D 5/032 523/205 |
| 7,244,780 B1 * | 7/2007 | Robinson | | C09D 5/032 524/439 |
| 7,468,401 B2 * | 12/2008 | Ferencz | | C09D 5/032 523/171 |
| 8,063,116 B2 * | 11/2011 | Trogolo | | A01N 59/16 428/407 |
| 8,518,449 B2 * | 8/2013 | Trogolo | | A01N 25/10 424/497 |
| 2001/0006993 A1 * | 7/2001 | Ring | | C09D 85/031 524/599 |
| 2001/0031817 A1 * | 10/2001 | Hashizume | | C09D 5/032 524/439 |
| 2001/0047062 A1 * | 11/2001 | Zhou | | C08G 59/4276 525/408 |
| 2001/0051227 A1 * | 12/2001 | Jung | | B05D 1/265 427/486 |
| 2003/0008963 A1 * | 1/2003 | Hashizume | | C09C 1/0015 524/439 |
| 2003/0100675 A1 * | 5/2003 | Goetz | | C08F 293/005 525/88 |
| 2003/0194554 A1 | 10/2003 | Petersen et al. | | |
| 2004/0230008 A1 * | 11/2004 | Correll | | C08J 3/243 525/326.2 |
| 2005/0182155 A1 | 8/2005 | O'Dell et al. | | |
| 2006/0057363 A1 * | 3/2006 | Takahashi | | B05D 5/068 428/323 |
| 2006/0173113 A1 * | 8/2006 | Yabuta | | B05D 1/04 524/439 |
| 2007/0141356 A1 * | 6/2007 | Fugier | | C09D 167/00 428/413 |
| 2008/0022899 A1 * | 1/2008 | Tsuji | | C09D 5/032 106/404 |
| 2008/0148994 A1 * | 6/2008 | Magnin | | A01N 25/10 106/15.05 |
| 2009/0136737 A1 * | 5/2009 | Ring | | C09D 5/031 428/323 |
| 2009/0155462 A1 * | 6/2009 | Flosbach | | C08G 18/4063 427/180 |
| 2009/0238981 A1 * | 9/2009 | Decker | | C09D 5/032 427/386 |
| 2009/0252869 A1 * | 10/2009 | Rodrigo | | C09D 167/06 427/180 |
| 2010/0144927 A1 * | 6/2010 | Flosbach | | C08G 18/097 523/400 |
| 2012/0231283 A1 * | 9/2012 | Buijsen | | C08G 63/20 428/458 |

FOREIGN PATENT DOCUMENTS

| | | | |
|---|---|---|---|
| JP | 2001-181576 A | | 7/2001 |
| JP | 2001-329226 | * | 11/2001 |
| JP | 2001-329226 A | | 11/2001 |
| JP | 2001329226 A | | 11/2001 |
| JP | 2006-213771 | * | 8/2006 |
| JP | 2006-213771 A | | 8/2006 |
| KR | 10-2011-0119635 A | * | 11/2011 |

* cited by examiner

PRIOR ART

US 9,447,290 B2

POWDER PAINT COMPOSITION AND METHOD FOR PREPARING SAME

CROSS-REFERENCE TO RELATED APPLICATIONS

This application claims priority under 35 U.S.C. §119 to Korean Patent Application No. 10-2013-0106807, filed on Sep. 5, 2013, in the Korean Intellectual Property Office, the disclosure of which is incorporated herein by reference in its entirety.

BACKGROUND (a) Technical Field

The present invention relates to a powder paint composition and a method for preparing the same. More particularly, the present invention relates to a powder paint composition prepared by physically attaching metallic particles to a powder resin, thereby providing a single paint composition ("unification type composition") combining both metallic particles and a powder resin in a single layer. The powder paint composition of the present invention exhibits no separation or aggregation of metallic particles when coated and also provides a significantly improved metallic texture owing to the orientation of the metallic particles.

(b) Background Art

A powder paint refers to a paint in powder form, which includes a synthetic resin involved in film formation, a pigment, etc. as main components and, optionally, is further mixed with a proper curing agent, filler, etc. Such powder paints do not include a solvent, such as an organic solvent, a reactive monomer, water, etc., which is used in a conventional liquid paint composition.

These powder paints exhibit excellent appearance and mechanical/chemical properties. Also, with the advancement in technology, it has become possible to improve the particle size distribution or dispersibility of the powder paint. Further, since it is very convenient to use, the powder paint is widely used in various industrial applications.

Among the various types of powder paints, a pure epoxy resin-based paint has superior corrosion resistance, chemical resistance, water resistance, etc. and is mainly used in applications, such as plumbing, gas pipes, automobile parts, etc., requiring durability. An epoxy polyester resin-based paint is the most widely used powder paint. With relatively well-balanced film properties, it is widely used in various metal furniture, kitchenware, electric home appliances, construction materials, etc. Polyurethane resin-based paints are superior in appearance, processability, fouling resistance, etc. and are commonly used in electric home appliances, or the like.

In addition, a pure polyester resin-based paint, which exhibits superior weather resistance, is used in aluminum chassis, agricultural machinery, vending machines, aluminum wheels, etc.

In automobile parts where a metallic texture is required, such as the aluminum wheels, a powder paint using a polyester resin-based powder resin as a primer, which is then coated with a liquid base component and finished with a powder, is generally used to provide the desired metallic texture.

One example of a powder paint providing metallic texture is described by US Patent Application Publication No. 2003-0194554, which proposes a paint prepared by charging a powder coating composition including a metallic-effect pigment into a mixer and then adding a powdered chromatic pigment to the mixer. Japanese Patent Publication No. 2001-329226 describes another example in which a powder paint composition is obtained by mixing metal flakes having a leafing agent adsorbed on the surface thereof with a thermosetting resin powder, or by bonding metal flakes having a leafing agent adsorbed on the surface thereof to the surface of a thermosetting resin powder.

Further, US Patent Application Publication No. 2005-0182155 proposes a method for obtaining a colored mixture by providing a base powder, providing a stable colorant dispersion and mixing the base powder with the colorant dispersion. Japanese Patent Application Publication No. 2001-139887 proposes a metallic powder coating composition formed by preheating a powder coating material and a metallic pigment covered with a three-dimensionally cross-linked resin having high compatibility with the powder coating material to a temperature higher than the softening point of the powder coating material. This results in fusion of the metallic pigment with the surface and inside of the resin particles of the powder coating material.

The above powder paint compositions include a powder resin for exhibiting a metallic texture mixed with a metallic pigment or metal flakes.

However, since these powder paints require application of two coating layers in addition to a finish coating, the metallic particles exist in a paint phase separated from the powder resin that constitutes the base powder, as schematically shown in FIG. 1. As a result, the metallic particles are oriented randomly in a film formed by coating and curing the paint, the angle of light reflection is random and the paint is limited in its ability to provide an improved metallic texture.

In order to achieve a metallic texture, metallic particles such as aluminum flakes, etc. have to be mixed in the paint. However, the existing powder resin primers for industrial use are not suitable for automobile use because of staining caused by a difficulty in uniform mixing with the metallic particles and because of diffusion of light reflection caused by random orientation of the particles. Still further, it is difficult to obtain a desired the metallic texture with the existing liquid paints.

Further, as the number of coating applications increases, the appearance becomes worse, particularly because of difficulty in handling impurities. However, if layers are omitted, desired properties may not be obtained. For example, if the base layer is simply omitted to reduce the number of processes and reduce production costs, it is difficult to achieve a high-quality metallic texture desired by consumers.

Accordingly, development of a powder paint which can provide a high-quality metallic texture and which can be prepared by a simple process is keenly needed.

Throughout the specification, a number of publications and patent documents are referred to and cited. The disclosure of the cited publications and patent documents is incorporated herein by reference in its entirety to more clearly describe the state of the related art and the present invention.

SUMMARY

The present invention solves the above-described problems of the existing art and provides an improved powder paint composition that, when applied, exhibits an excellent metallic texture as well as good corrosion resistance, etc. In particular, the powder paint composition of the present invention includes metallic particles directly attached to a powder resin. The powder paint composition can be coated as a single layer to provide excellent metallic texture as well as good corrosion resistance, etc. and thus, provide a simplified process.

According to one aspect, the present invention provides a novel powder paint composition that includes a powder wherein metallic particles are physically attached to a powder resin.

According to various embodiments, the novel powder paint composition forming a coating that exhibits a superior metallic texture and which can simplify a coating process. According to various embodiments, the powder paint composition comprises a polyester-based powder resin and metallic particles as main components, wherein the metallic particles are physically attached to the powder resin. The metallic particles and the powder resin are, thus, combined in a single powder paint composition to provide a coating that alone imparts a combination of desired properties.

According to another aspect, the present invention provides a method for preparing a novel powder paint composition by combining powder resin particles and metallic particles in a single composition, more particularly, by physically attaching metallic particles to powder resin particles.

According to various embodiments, the method for preparing the powder paint composition includes: preparing a powder resin using a polyester-based powder resin and an epoxy powder resin; slowly heating the powder resin from about 15-30° C. to about 85-95° C.; preparing a powder mixture by adding metallic particle flakes and a viscosity control resin to the heated powder resin; attaching metallic particles to the powder resin by stirring the resulting mixture while maintaining the temperature about 85-95° C.; slowly cooling the stirred mixture to about 15-30° C.; and classifying the cooled mixture and separating and removing metallic particles and powder resin that are unattached to each other.

In another aspect, the present invention provides a method for coating the powder paint composition including: applying the powder paint composition by any known powder paint application methods; curing the resulting film to form a cured film; forming a powder clear layer by applying a powder resin on the cured film; and completing the coating by curing the powder clear layer.

In another aspect, the present invention provides an automobile part coated with the powder paint composition. The thus coated automobile part exhibits superior metallic texture, corrosion resistance and appearance.

The powder paint composition prepared according to the present invention, wherein the metallic particles are directly attached to the powder resin and which is coated as a single layer, exhibits a very superior metallic texture owing to superior corrosion resistance and uniform orientation of the metallic particles.

Further, since the powder resin and the metallic particles are unified into a single composition, a coating process can be simplified and costs can be reduced.

In addition, since a metallic texture can be achieved using various metallic particles, high-quality coating of various colors can be achieved.

Other features and aspects of the present invention will be apparent from the following detailed description, drawings and claims.

BRIEF DESCRIPTION OF THE DRAWINGS

The above and other objects, features and advantages of the present invention will now be described in detail with reference to certain exemplary embodiments thereof illustrated in the accompanying drawings which are given hereinbelow by way of illustration only, and thus are not limitative of the invention, and wherein.

Figure 1:
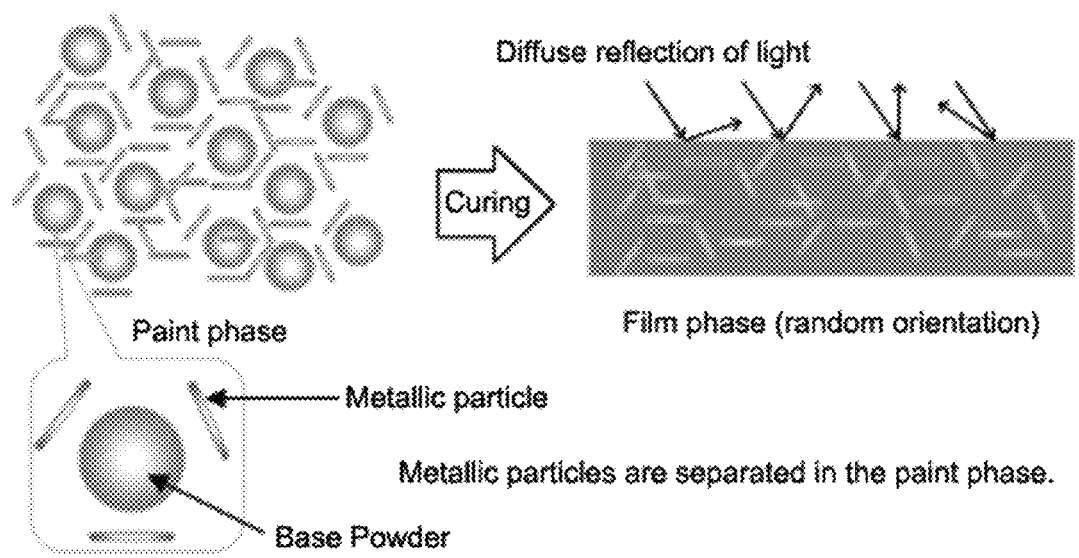
FIG. 1 schematically shows the microscopic structure and characteristics of a powder paint composition including metallic particles prepared according to the conventional method.

It should be understood that the appended drawings are not necessarily to scale, presenting a somewhat simplified representation of various preferred features illustrative of the basic principles of the invention. The specific design features of the invention as disclosed herein, including, for example, specific dimensions, orientations, locations and shapes, will be determined in part by the particular intended application and use environment.

DETAILED DESCRIPTION

Hereinafter, reference will now be made in detail to various embodiments of the present invention, examples of which are illustrated in the accompanying drawings and described below. While the invention will be described in conjunction with exemplary embodiments, it will be understood that the present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a," an and the are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about".

The present invention provides a powder paint composition having a polyester-based powder resin and metallic particles as main components. More particularly, the present invention provides a powder paint composition which includes a powder wherein the metallic particles are physically attached to the powder resin.

According to various embodiments of the present invention, the metallic particles are attached to the powder resin by a viscosity control resin.

In an exemplary embodiment of the present invention, the powder paint composition includes about 30-40 wt % of a polyester powder resin, about 30-40 wt % of an epoxy powder resin, about 0.5-2 wt % of a silicon-modified acryl resin as a viscosity control resin, about 1-5 wt % of metallic particles (preferably in the form of flakes), about 0.5-15 wt % of a coloring pigment, about 10-20 wt % of an extender pigment and about 0.5-3 wt % of a curing agent, based on the total weight of the powder paint composition.

According to various embodiments, the powder resin used in the powder paint composition according to the present invention includes about 30-40 wt % of the polyester powder resin and about 30-40 wt % of the epoxy powder resin based on the total weight of the paint composition. The polyester powder resin is a resin that predominantly determines weather resistance, appearance, etc. Any conventional polyester powder resins that provide such properties can suitably be used. If the content of the polyester powder resin is too low, weather resistance may be insufficient, but if its content is too high, appearance of the coating may be unsatisfactory. The epoxy powder resin component is used for providing important physical properties such as chemical resistance, corrosion resistance, etc. Any conventional epoxy powder resins that provide such properties can suitably be used. If the content of the epoxy powder resin is too low, corrosion resistance may be insufficient, but if its content is too high, weather resistance may be insufficient.

In the powder paint composition of the present invention, the metallic particles can be in any conventional form and, preferably, are included in a flake form. The metallic particles are not particularly limited and may be, for example, aluminum, chromium, zinc, mica, etc. The metallic particles preferably have an average particle diameter of 5-30 μm, more specifically 10-20 μm. If the amount of the metallic particles is too small based on the total composition, it is difficult to achieve a metallic texture. On the other hand, if the amount of the metallic particles is too high, the risk of particle aggregation may increase.

According to the present invention, the powder resin is included in the paint composition with the metallic particles physically attached thereto. More specifically, the metallic particles may be attached to the surface of the powder resin by the use of a viscosity control resin. The viscosity control resin may be any conventional viscosity control resin, such as a silicon-modified acryl resin, an epoxy-modified acryl resin, etc. The viscosity control resin is preferably used in an amount of about 0.1-3 wt %, more specifically about 0.5-2 wt %, based on the total weight of the powder paint composition. If the amount of the viscosity control resin is too small, the metallic particles may not be oriented uniformly. On the other hand, if the amount of the viscosity control resin is too large, flowing may occur (i.e., the viscosity of the composition may be too low).

In the present invention, one or more coloring pigment and one or more extender pigments may further be used as pigments. Any conventional coloring pigments may be used. Some specific coloring pigments may be selected from carbon black, barium sulfate ($BaSO_4$), titanium dioxide ($TiO_2$), etc. If the coloring pigment is used in excess, the color imparted may be strong, but it may undesirably negatively affect physical properties of the composition. Further, while the use of carbon black provides a dark color, barium sulfate provides a bright color. According to a preferred embodiment, the coloring pigment includes about 0.1-1 wt % of carbon black and about 5-10 wt % of barium sulfate based on the total weight of the powder paint composition. Any conventional extender pigments may be suitably used such as, for example, calcium carbonate ($CaCO_3$), talc, etc. If the amount of the extender pigment is too small, it is difficult to obtain a film of sufficient thickness. On the other hand, if the amount of the extender pigment is excessive, an adhesion property of the composition may be unsatisfactory.

According to various embodiments, the powder paint composition according to the present invention may further include a curing agent, UV absorbent, pinhole inhibitor, etc. as additives. For example, a curing agent may be used to control the rate of curing and reaction of the paint. As the curing agent, any conventional agents such as blocked isocyanate, dicyanamide, etc. may be used. If the amount of the curing agent is too small, film formation may become difficult because of incomplete curing. On the other hand, if the amount of curing agent is excessive, storage stability may decrease. As a UV stabilizer for preventing surface aging caused by UV, any conventional UV stabilizers such as, for example, a benzophenol derivative, a hindered amine light stabilizer (HALS), etc. may be used. Preferably the amount of UV stabilizer is about 0.1-1 wt % based on the total paint composition. If the amount of the UV stabilizer is too small, surface damage may occur due to UV. On the other hand, if the amount of UV stabilizer is excessive, appearance may be negatively affected. Further, as the pinhole inhibitor, any conventional pinhole inhibitors may be suitably be used. For example, an acryl copolymer, etc. may be used, preferably in an amount of about 0.1-1 wt %.

Hereinafter, an exemplary embodiment of a method for preparing the powder paint composition according to the present invention will be described in detail.

The present invention provides a method for preparing a powder paint composition having a polyester-based powder resin and metallic particles as main components, which includes: preparing a powder resin; slowly heating the powder resin under a specific temperature condition; adding metallic particles, preferably in the form of flakes, and a viscosity control resin; and stirring, cooling and separating the resulting mixture.

Preferably the powder resin is prepared using a polyester-based powder resin and an epoxy powder resin. In this process, a base powder having a powder resin as a main component may be prepared by further adding a pigment, an additive, etc. to the powder resin. A commonly employed powder paint preparation process may be used for this process.

The prepared powder resin is then slowly heated from an initial temperature (e.g., about 15-30° C.) to about 85-95° C.

In this process, the base powder which is formed of the prepared powder resin is slowly heated to the glass transition temperature ($T_g$). This can be carried out using any conventional heating means such as, for example, a heat exchanger. In an exemplary embodiment of the present invention, the powder resin may be slowly heated from about 15-30° C. to about 85-95° C. By carrying out such slow heating to the specified temperature, the surface of the powder resin particles becomes adhesive. If the heating temperature is lower than 85° C., the surface of the powder resin particles may not become effectively adhesive and, as a result, metallic particles added later may not be attached well thereto. On the other hand, if the heating temperature exceeds 95° C., physical properties may deteriorate due to chemical modification of the materials. Further, it is important to carry out the heating slowly, so that the surface of the powder resin particles can become adhesive without chemical modification. For example, the heating may be performed slowly for about 60-120 minutes, more specifically for about 80-100 minutes. If the heating is carried out too fast, the surface of the powder resin may become chemically modified. On the other hand, if the heating is carried out too slowly, the powder resin particles may aggregate with each other.

A powder mixture is then prepared by adding metallic particles and a viscosity control resin to the heated powder resin.

Metallic particles, e.g., aluminum particles, are preferably added in flake form. In order to improve attachment to the powder resin particles, a viscosity control resin, such as a silicon-modified acryl resin, is added together with the metallic particles to form the powder mixture.

Next, the metallic particles are attached to the powder resin by stirring the resulting mixture at a heightened temperature, preferably about 85-95° C.

This stirring process is performed to physically attach the metallic particles to the powder resin particles. Preferably, the stirring is performed at about 85-95° C., such that the metallic particles are attached well. According to preferred embodiments, the stirring may be performed for about 5-20 minutes, more specifically for about 5-12 minutes, at about 100-150 rpm. If the stirring time is too short, the number of the metallic particles attached to the powder resin particles may be too small and it may be difficult to achieve a metallic texture after a film is formed. On the other hand, if the stirring time is too long, excess metallic particles may be attached on the surface of the powder resin particles. This can result in aggregation of the powder resin particles and a satisfactory metallic texture.

Upon completion of stirring, the mixture is slowly cooled to about 15-30° C.

In this process, the stirred mixture is slowly cooled to about 15-30° C., specifically to room temperature, such that the metallic particles remain attached well to the powder resin particles. Similar to the heating of the powder resin particles, the cooling is preferably performed slowly for about 60-120 minutes, more preferably for about 80-100 minutes. If the cooling time is too short, segregation may occur between the powder resin particles and the metallic particles. In contrast, if the cooling time is too long, the powder resin particles to which the metallic particles are attached may aggregate with each other.

Following the cooling, the mixture is classified and metallic particles and powder resin that are unattached are separated from the mixture and removed. As a result, a powder paint composition is prepared which comprises metallic particles physically attached to a powder resin.

In this process, the prepared powders are classified, for example, in a commonly used particle classifier to obtain a desired particle size distribution. A superior metallic texture may be achieved when an average particle diameter is about 15-70 µm, more specifically about 30-60 µm. If the particle diameter is too small, the metallic particles may be brittle and it is difficult to achieve a desired metallic texture. On the other hand, if the particle diameter is too large, it may be difficult to coat the resulting powder paint composition. In this process, the unattached metallic particle flakes and the unattached powder resin particles are separated and removed from the mixture to provide the desired powder paint composition.

The powder paint composition according to the present invention prepared through the described processes exhibit a very superior coating effect because the metallic particles are physically attached to the powder resin particles.

FIG. 1 schematically shows the microscopic structure and characteristics of a powder paint composition including metallic particles prepared according to a conventional method. It can be seen that the metallic particles are randomly oriented in the powder paint composition.

Figure 2:
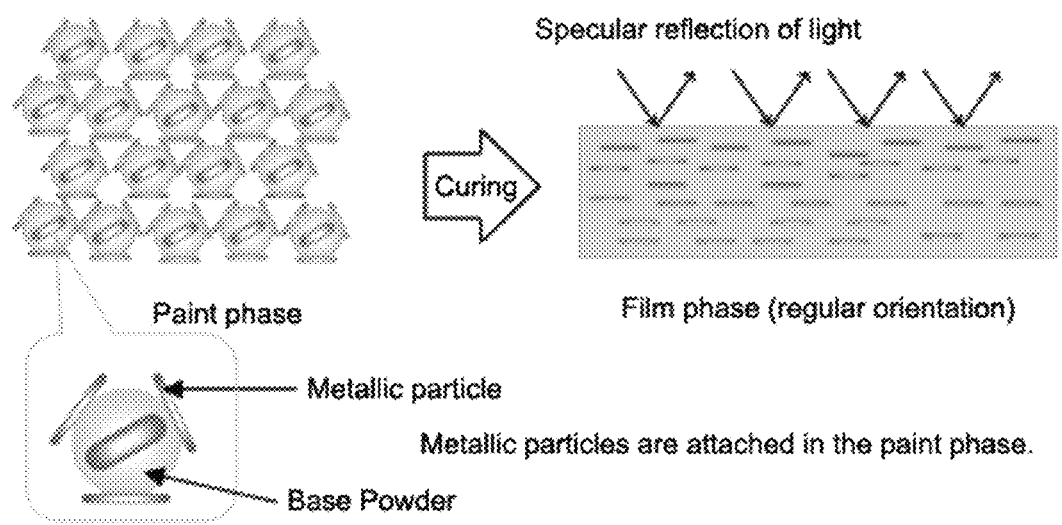
FIG. 2 schematically shows the microscopic structure and characteristics of a novel powder paint composition of unification type prepared according to an embodiment of the present invention.

FIG. 2 schematically shows the microscopic structure and characteristics of a novel powder paint composition prepared according to the present invention. It can be seen that metallic particles are attached on the surface of powder resin particles and are regularly oriented after being coated.

Referring to FIG. 1, in case of the conventional powder paint composition, since the base powder (i.e., powder resin particles) is separated from the metallic particles the paint phase, a film obtained after curing exhibits unsatisfactory corrosion resistance. Also, since light is diffusely reflected on the film because the metallic particles are randomly oriented, there is a limitation in exhibiting a desired metallic texture. Accordingly, the conventional powder paint composition is not suitable for coating high-end parts, such as an automobile wheel.

Referring to FIG. 2, in the case of the powder paint composition according to the present invention, since the metallic particles are directly attached to the base powder (i.e., powder resin particles) in the paint phase, a film obtained after curing exhibits very superior corrosion resistance. Also, since light is spectrally reflected on the film because the metallic particles are very regularly oriented, a very superior metallic texture can be exhibited. Accordingly, the powder paint composition according to the present invention is suitable for coating high-end parts, such as an automobile wheel.

According to preferred embodiments, the novel powder paint composition according to the present invention as shown in FIG. 2 is prepared by slowly heating powder resin particles at a predetermined temperature so as to provide adhesion property to the surface of the powder resin particles, such that metallic particles can be physically attached thereto.

Figure 3:
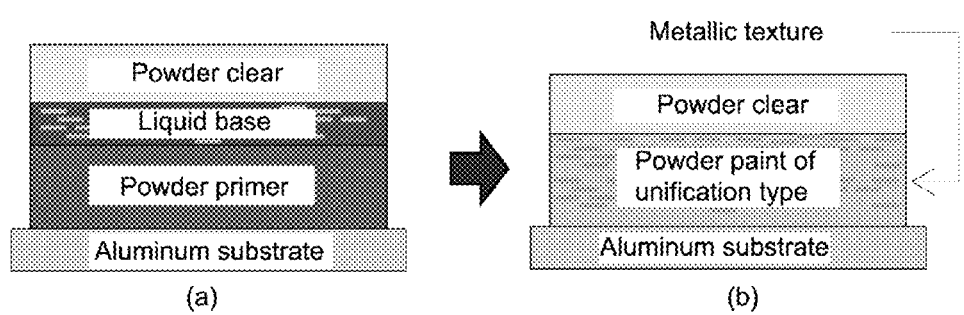
FIG. 3 schematically shows (a) the existing powder paint coating layer having a separated, three-layered coating structure and (b) a powder paint composition according to an embodiment of the present invention having a two-layered coating structure.

FIGS. 3(a)-(b) show the structures of coating layers formed after coating the powder paint compositions on an article to be coated (aluminum substrate). FIG. 3 (a) shows the conventional powder paint coating layer having a separated, three-layered coating structure and FIG. 3 (b) shows the powder paint composition according to the present invention having a two-layered coating structure. As shown in FIG. 3(b), the powder paint composition is referred to as a unification type because it combines both metallic particles and a powder resin in a single layer in contrast with the conventional composition.

The present invention also provides a method for coating an article to be coated using the novel powder paint composition according to the present invention. In particular, the paint composition is coated to have the layered structure shown in FIG. 3 (b).

The method for coating the powder paint composition according to the present invention includes: applying the powder paint composition on an article to be coated as a film; curing the resulting film; forming a powder clear layer by applying a powder resin on the cured film; and completing the coating by curing the powder clear layer.

To describe the coating method according to the present invention in more detail, the powder paint composition is first applied (as a coating, which is also referred to herein as a film) on an article to be coated. The powder paint composition can be applied in the same manner as that for the conventional powder paint composition and, thus, the application process is not particularly limited.

Then, the resulting film is cured. In this process, curing of the applied powder paint composition is dried using any commonly employed film drying method.

Subsequently, a powder clear layer is formed by applying a powder resin directly on the cured film. In accordance with the present invention, the coating process can be completed directly with the powder clear layer without additional coating steps. This process is possible because, instead of the conventional three-layer coating method of coating a solid powder resin and then coating a liquid base which includes metal flakes, a two-layer coating method is employed in the present invention using the powder paint composition that can be coated in a single layer, the single layer including both the powder resin and the metal powder (e.g. metal powder in the form of flakes).

After the powder clear layer is applied, the coating process is completed by curing the powder clear layer according to any commonly employed curing method.

The resulting coating film, which is obtained by coating the powder paint composition of the present invention, exhibits a superior metallic texture as well as other improved physical properties including corrosion resistance.

The present invention also provides an automobile part coated with the powder paint composition of the present invention.

The automobile part to which the powder paint composition according to the present invention can be coated includes a large variety, including an automobile wheel, an automobile caliper, a wiper blade arm, etc. The powder paint composition of the present invention beneficially provides a good appearance to the automobile part.

EXAMPLES

The present invention will be described in more detail through examples. The following examples are for illustrative purposes only and it will be apparent to those skilled in the art not that the scope of this invention is not limited by the examples.

Example 1

A powder resin-containing a base powder was prepared using 36.2 parts by weight of a polyester powder resin for a powder paint and 35.2 parts by weight of an epoxy powder resin for a powder paint, as powder resins, and adding 0.5 part by weight of carbon black and 9.3 parts by weight of barium sulfate, as coloring pigments, 12.9 parts by weight of calcium carbonate as an extender pigment, and 1.3 parts by weight of blocked isocyanate as a curing agent thereto, based on 100 parts by weight of the total powder paint composition.

The powder resin-containing base powder was slowly heated from 20° C. to 90° C. for 90 minutes in a heating stirrer.

After adding 3.1 parts by weight of aluminum flakes as metallic particles to the heated powder resin-containing the base powder, the mixture was stirred at 100 rpm for 10 minutes while maintaining the mixture at 90° C.

Upon completion of stirring, the mixture was slowly cooled from 90° C. to 20° C. for 90 minutes and put in a particle classifier. A powder paint composition in accordance with the present invention was prepared by classifying only the particles having particle diameters between 15 and 45 μm and removing other particles as well removing metallic particles and powder resin particles which were unattached to each other.

Example 2

A powder paint composition in accordance with the present invention was prepared in the same manner as in Example 1, except for further using a benzophenol derivative as a UV absorbent and an acryl copolymer as a pinhole inhibitor, according to the composition described in Table 1 and the preparation condition described in Table 2.

Example 3

A powder paint composition in accordance with the present invention was prepared in the same manner as in Example 2, according to the composition described in Table 1 and the preparation condition described in Table 2.

Comparative Example 1

A conventional powder paint composition for industrial metallic coating was prepared in the same manner as in Example 2, except for mixing a powder resin as a base powder with metallic particle flakes without the heating or cooling processes at specific temperatures described in Example 2.

Comparative Example 2

A conventional powder paint composition was prepared in the same manner as in Example 2, except for not using a viscosity control resin, according to the composition described in Table 1 and the preparation condition described in Table 2.

TABLE 1

| Components (parts by weight) | | Ex. 1 | Ex. 2 | Ex. 3 | Comp. Ex. 1 | Comp. Ex. 2 |
|---|---|---|---|---|---|---|
| Resins | Polyester powder resin | 36.2 | 35.2 | 35.2 | 35.2 | 35.2 |
| | Epoxy powder resin | 35.2 | 34.7 | 34.7 | 34.7 | 34.7 |
| | Viscosity control resin | 1.5 | 1.5 | 1.5 | — | — |

TABLE 1-continued

| Components (parts by weight) | | Ex. 1 | Ex. 2 | Ex. 3 | Comp. Ex. 1 | Comp. Ex. 2 |
|---|---|---|---|---|---|---|
| Pigments | Aluminum flakes | 3.1 | 3.1 | 3.1 | 3.1 | 3.1 |
|  | Carbon black | 0.5 | 0.5 | 0.5 | 0.5 | 0.5 |
|  | Barium sulfate | 9.3 | 7.7 | 7.7 | 7.7 | 7.7 |
|  | Calcium carbonate | 12.9 | 14.5 | 14.5 | 16.0 | 16.0 |
| Additives | Curing agent | 1.3 | 1.3 | 1.3 | 1.3 | 1.3 |
|  | UV absorbent | — | 0.8 | 0.8 | 0.8 | 0.8 |
|  | Pinhole inhibitor | — | 0.7 | 0.7 | 0.7 | 0.7 |
| Total | Powder paint composition | 100 | 100 | 100 | 100 | 100 |

TABLE 2

| Preparation condition | Ex. 1 | Ex. 2 | Ex. 3 | Comp. Exs. |
|---|---|---|---|---|
| Max. heating temperature (° C.) | 90 | 90 | 90 | 100 |
| Heating time (min) | 90 | 90 | 90 | 90 |
| Stirring time (min) | 10 | 10 | 7 | 15 |
| Cooling time (min) | 90 | 90 | 90 | 90 |
| Classified particle diameter (μm) | 15-45 | 30-60 | 30-60 | 30-60 | space

Test Examples

The powder paint compositions prepared in Examples 1-3 and Comparative Examples 1-2 were coated on an aluminum wheel under the same conditions and then physical properties were evaluated. The results are shown in Table 3. In Examples 1-3, the aluminum wheel was coated with two layers, with a single layer of the powder paint composition according to the present invention (see FIG. 3 (b)). In Comparative Example 2, the aluminum wheel was coated with three layers (see FIG. 3 (a)). In Comparative Example 1, the aluminum wheel was coated similarly to Examples 1-3.

Methods of Carrying Out Physical Property Measurements

Metallic texture: Visual evaluation was made against a reference plate and the F.I. value was measured using a colorimeter.

Film thickness: Film thickness was measured using an electronic film thickness gauge.

Brine resistance: The degree of corrosion was evaluated after 720 hours according to JIS Z2371 (brine spray test).

Hardness: The dried film was scratched with various pencils (B, HB, F, H, 2H, 3H, 4H, etc.) at an angle of 45° according to JIS K5400 (pencil test method) and the degree of scratching was visually evaluated.

Adhesion property: According to JIS D0202, the test sample (film) was placed on a horizontal plane and cut by a razor to make a checked pattern of 100 (10×10) 2-mm wide sections, at an angle of about 30°. After tightly attaching a cellophane adhesive tape on the pattern, the tape was peeled by instantly pulling at one end. The degree of peeling was visually evaluated according to JIS D0202.

Chipping resistance: Chipping resistance was evaluated using a chipping tester according to SAE J400.

Chemical resistance: The degree of corrosion was evaluated after 720 hours according to JIS Z2371 (brine spray test).

Solvent resistance: After rubbing 10 times with a cotton swab soaked with xylene, the surface state of the film was evaluated.

Weather resistance: After 300 hours of accelerated weathering using Xenon Weather-O-Meter, adhesion property and color were evaluated.

TABLE 3

|  | Requirements | Ex. 1 | Ex. 2 | Ex. 3 | Comp. Ex. 1 | Comp. Ex. 2 |
|---|---|---|---|---|---|---|
| Metallic texture (brightness) | 10 or higher | 11.1 | 12.7 | 11.3 | 6.0 | 9.3 |
| Film thickness (μm) | 80 or higher | 90 | 90 | 85 | 90 | 92 |
| Brine resistance (mm) | 3 or smaller | 1 | 1 | 1 | 5 | 2 |
| Hardness | HB or better | HB | HB | HB | HB | HB |
| Adhesion property | M-2.5 or less | 1.0 | 1.0 | 1.0 | 1.0 | 1.0 |
| Chipping resistance | −30° C., grade 3 or better | good | good | good | good | good |
| Chemical resistance | No abnormality | good | good | good | good | good |
| Solvent resistance | Xylene, 10 or more times | good | good | good | good | good |
| Weather resistance | M-2.5 or lower | 1.5 | 1.0 | 1.5 | 4.0 | 2.0 |

As shown in Table 3, the powder paint compositions of Examples 1-3 according to the present invention exhibited superior physical properties. In particular, since these compositions exhibited a very superior metallic texture as well as other required physical properties, including corrosion resistance, the powder paint compositions of the present invention can be suitably used for coating high-quality aluminum wheels. The powder paint composition of Example 2 was slightly better in metallic texture than that of Examples 1 and 3. The reason for this difference may be because the metallic particles were partly broken during the classification because of relatively smaller particle size of the powder paint composition of Example 1 as compared to Examples 2-3. In addition, for Example 3, the reason for the slightly less desirable metallic texture may be because less metallic particles were attached to the powder resin particles because of a shorter stirring time as compared to Example 2. Nonetheless, the powder paint compositions of Examples 1 and 3 show very superior metallic texture when compared with Comparative Examples 1-2. In particular, since the compositions of Examples 1-3 can be formed into a two-layered coating film, processing time can be reduced as compared to Comparative Example 2 which requires a three-layered coating.

In contrast, the existing powder paint composition of Comparative Example 1 would not be suitable for use in coating of an automobile wheel when only a two-layered coating film was formed (in a process similar to Examples 103) using this composition.

When the powder paint composition of Comparative Example 2, which used a liquid base including metallic particle flakes, was formed into a separated, three-layered coating, physical properties were similar to those of Examples 1-3 but metallic texture was worse than those of Examples 1-3.

Accordingly, it was confirmed that the powder paint compositions of Examples 1-3 according to the present invention exhibit superior properties and a high-quality metallic texture.

The powder paint composition of a unification type according to the present invention can suitably be widely utilized in various industrial parts, electric home appliances, construction materials, structures, automobile parts, etc. requiring high-quality metallic texture.

The present invention has been described in detail with reference to specific embodiments thereof. However, it will be appreciated by those skilled in the art that various changes and modifications may be made in these embodiments without departing from the principles and spirit of the invention, the scope of which is defined in the appended claims and their equivalents.

What is claimed is:

1. A method for preparing a powder paint composition having a polyester-based powder resin and metallic particles as main components, which comprises:
   preparing a powder resin using a polyester-based powder resin and an epoxy powder resin;
   heating the powder resin from about 15-30° C. to about 85-95° C.;
   preparing a powder mixture by adding metallic particle flakes and a viscosity control resin to the heated powder resin;
   attaching metallic particles to the powder resin by stirring the resulting mixture while maintaining a temperature at about 85-95° C.;
   cooling the stirred mixture to about 15-30° C.; and
   classifying the cooled mixture and separating and removing unattached metallic particles and unattached powder resin;
   wherein said heating is performed for about 80-100 minutes, said cooling is performed for about 80-100 minutes.

2. The method for preparing a powder paint composition according to claim 1, wherein the powder paint composition comprises about 30-40 wt % of a polyester powder resin, about 30-40 wt % of an epoxy powder resin, about 0.5-2 wt % of a silicon-modified acryl resin as a viscosity control resin, about 1-5 wt % of metallic particle flakes, about 0.5-15 wt % of a coloring pigment, about 10-20 wt % of an extender pigment and about 0.5-3 wt % of a curing agent, based on total weight of the powder paint composition.

3. The method for preparing a powder paint composition according to claim 2, wherein the coloring pigment comprises about 0.1-1 wt % of carbon black and about 5-10 wt % of barium sulfate, based on the total weight of the powder paint composition.

4. The method for preparing a powder paint composition according to claim 2, wherein the extender pigment is calcium carbonate.

5. The method for preparing a powder paint composition according to claim 1, wherein said stirring is performed for about 5-20 minutes.

6. The method for preparing a powder paint composition according to claim 1, wherein said classifying is performed based on an average particle diameter of about 15-70 μm and unattached metallic particle flakes and unattached powder resin particles are removed from the mixture.

7. A method for coating a powder paint composition, comprising:
   applying the powder paint composition according to claim 1 on an article to be coated to form a film;
   curing the resulting film;
   forming a powder clear layer by applying a powder resin on the cured film; and
   finishing coating by curing the powder clear layer.

8. The method for preparing a powder paint composition according to claim 1, wherein the viscosity control resin is a silicon-modified acryl resin or an epoxy-modified acryl resin.

9. The method for preparing a powder paint composition according to claim 1, wherein the powder paint composition further comprises about 0.1-1 wt % of a UV stabilizer and/or about 0.1-1 wt % of a pinhole inhibitor, based on total weight of the powder paint composition.

10. The method for preparing a powder paint composition according to claim 1, wherein the metallic particle flakes are aluminum flakes.

* * * * *